March 30, 1943. M. K. DRESDEN 2,315,319
SINGLE USE TUBE AND MOUNT
Filed March 23, 1940
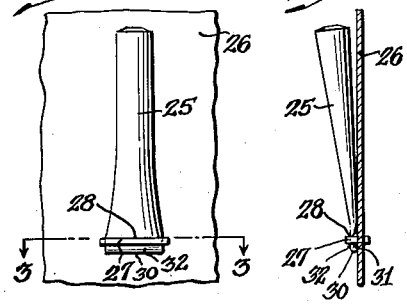
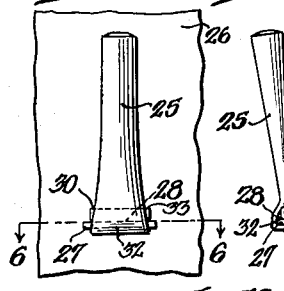
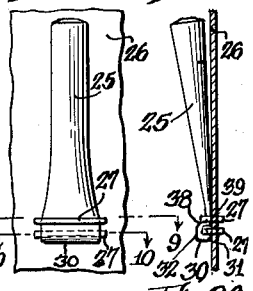
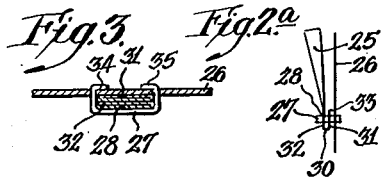
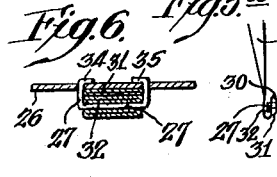
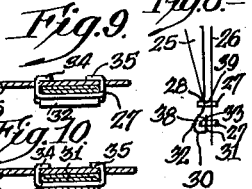
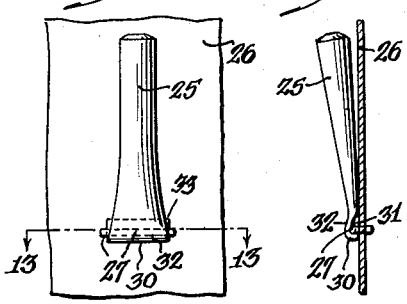
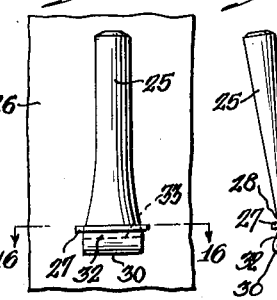
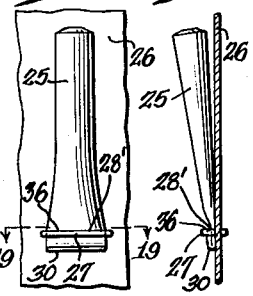
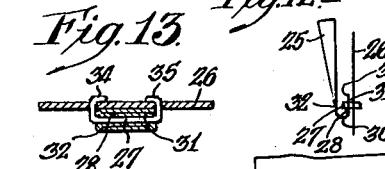
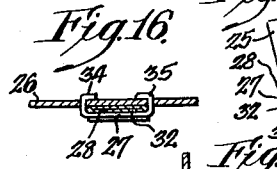
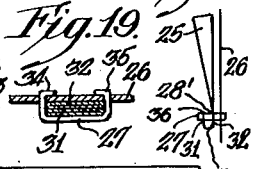
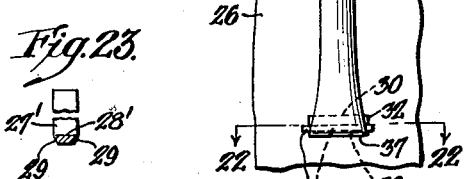
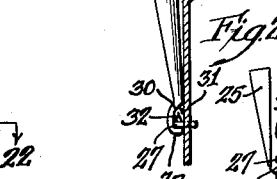
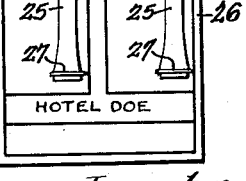
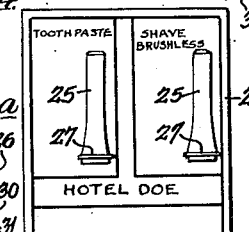
Inventor
Mark Kenyon Dresden Patented Mar. 30, 1943

2,315,319

UNITED STATES PATENT OFFICE 2,315,319

SINGLE USE TUBE AND MOUNT

Mark Kenyon Dresden, Media, Pa., assignor to A. H. Wirz Inc., Chester, Pa., a corporation of Pennsylvania Application March 23, 1940, Serial No. 325,543

5 Claims. (Cl. 206—80)

My invntion relates to the mounting of single use collapsible tubes upon a support, for convenience here considered to be a card.

One of the purposes of my invention is to mount a single use tube by holding its filling end to the card in such a way that the tube is cut or torn as it is removed from the card.

A further purpose is to make the walls of a card-mounted single use collapsible tube thinner than normal and to mount the tube by a fastening engaging the tube and of abrupt edge to facilitate cutting or tearing the tube against the edge of the fastening.

A further purpose is to hold a collapsible tube to its card by the bar of an abrupt-edged fastening such as a staple and, in removal, to cut it by pulling it across or against the staple.

A further purpose is to use a fastening by which a collapsible tube is card-mounted also as a means for closing and/or holding closed the filling (open) end of the tube.

A further purpose is to use a staple for the purpose of pressing against flattened collapsible tube walls at the filling end of the tube to hold or assist in holding the tube closed and to support the tube from a card and to use the staple hold as an abutment against which to tear the walls when the tube is removed.

Further purposes will appear in the specification and in the claims.

My invention resides in the methods involved as well as in mechanism by which these methods may be carried out.

I have preferred to illustrate the invention by a few forms only among the many in which it may appear, selecting forms which are practical and effective, which have been tested in manufacture, and which at the same time well illustrate the principle thereof.

Figures 1, 4, 7, 11, 14, 17 and 20 are front elevations of tubes and their supports illustrating slightly variant forms of the invention.

Figures 2, 5, 8, 12, 15, 18 and 21 are side elevations of the structures seen in Figures 1, 4, 7, 11, 14, 17 and 20.

Figures 2a, 5a, 8a, 12a, 15a, 18a and 21a are diagrammatic views corresponding with Figures 2, 5, 8 etc.

Figures 3, 6, 9, 10, 13, 16, 19 and 22 are sections upon lines 3—3 of Figure 1, 6—6 of Figure 4, 9—9 and 10—10 of Figure 7, 13—13 of Figure 11, 16—16 of Figure 14, 19—19 of Figure 17 and 22—22 of Figure 20, respectively.

Figure 23 is a central section of a staple.

Figure 24 is an elevation of a card containing two tubes.

In the drawing similar numerals indicate like parts.

Single use collapsible tubes have found wide distribution. In some of these uses the small size of the tube or the conditions of use make it desirable that the tube be mounted upon a holder such as a card, which may, for example, tell its purpose, display or otherwise advertise it and prevent a small tube from being mislaid.

Such use of holding cards is of course well known. However in the present case it is the intention to provide in the mount means for closing the tube or assisting in holding it closed and means for facilitating opening of the tube by the act of disengagement. Examples of applications of the invention occur in tubes of tooth paste and shaving cream, provided for guests at hotels (see Figure 24), quite in line with the practice of furnishing individual cakes of soap, now quite generally supplied, and samples of powdered or granular solids or of pastes intended to acquaint the public with new products.

In carrying out the invention a tube 25 is mounted upon a card 26 by means of a fastening preferably in the form of a staple 27 in which the bar or central cross piece of the staple is tightened against the tube and is anchored in constricting position by the hold of the staple prongs. The staple not only affords a means of support but spans the tube and can be used to close the tube or to reduce the care which otherwise would be required to close it and keep it closed. It gives a binding restriction against which the walls of the tube can be cut or torn at the edge of the bar adjacent the body of the tube when the tube is pulled transversely to the bar to remove the tube from the mount.

To facilitate the opening of the tube the walls of the tube are preferably thinned as compared with the thickness of normal tubes. The amount of thinning which is desirable will depend both upon the metal used and upon the size of the tube and character of content. At least 20% thinning may be effected.

I have had excellent results with tubes of $\frac{3}{8}$ of an inch diameter, of tin and of a tube wall thickness .0025 inch using dental paste as a content. The figures of the drawing are full-size of the tubes made and tested.

Because pressure of the hand upon the tube in tearing or cutting the tube walls against a staple would cause immediate and excessive leakage of a liquid out of the bottom (the filling end) of the tube when the tube is withdrawn, the invention is not well suited to handle liquids. It is best suited to a solid content or to a semi-fluid such as a viscous, pasty or plastic product not subject to breaking down into parts of which one is a liquid.

Though the tube can extend in any desired direction from the fastening I prefer to extend it upwardly unless the weight of the content prove a factor and I have illustrated it in this preferred form.

The staple 27 operates to its best advantage when the surface of the staple bar directly engages a stretch of the tube in such a way that the bar is available to cut or tear the tube at the edge 28, most closely adjacent to the tube content and against which the tube formed as to be cut or torn, is an abrupt edge. This may be merely the normal inner edge of a staple of rectangular bar section such as shown, or may be specially prepared as a cutting edge by sloping the side staple bar surface adjacent the edge facing the content at 29 so that the angle at the edge 28' (see Figure 23) viewed as a cutting edge is an acute angle. In my use of the invention the acute angle cross-section at this edge had not proved to be necessary but this edge can be acute wherever the conditions make it desirable additionally to facilitate the cutting or tearing of the tube.

In the various figures I have shown different positions or relations of the terminal tube walls at the filling end with respect to the bar of the staple used, all of which have been tested out by me and have been found to be fully operative. These are given for the purpose merely of indicating that there is considerable variety to the way in which the sealing may be effected, all operative for use by cutting or tearing the tube against the bar and without any attempt to make the showing complete as to all of the ways in which this may be done and without negativing the use of any additional existing seals for the tube end where specially needed because of the character of content.

In all of the forms shown the staple constriction affords sufficient seal for solid contents and in all where two stretches of the tube length are constricted the seal is sufficient for the more viscous semi-fluids.

In Figures 1-3 the tube 25 is flattened at the filling end and the flat lower end is bent back reversely at 30 to provide two parallel reversely directed stretches 31 and 32 of tube length in position to be constricted by the staple bar and thus both supported and held closed. In normal use it is intended to rely upon this constriction for the closure though it is recognized that other existing means of closing the extreme end 33 of the tube may be used where the viscosity of the content is low or special need of preventing leakage is recognized.

For solid content tubes the bend at 30 need not be sharp. The staple prongs are clinched at the back of the card or other mount at 34, 35.

The reversely turned tube end with both flattened stretches under the staple is shown in the forms of Figures 1 to 3, 4 to 6, and 17 to 19, the differences being that in Figures 1 to 3 and 4 to 6 the final stretch 31 of the tube is next to the card, placing the staple bar directly in engagement at 28 with that tube stretch closest to the content of the two stretches under the bar, and, therefore with the only stretch in these forms which will be cut or torn. In Figures 17-19, a less desirable form, the staple bar engages at 36 with the final stretch 31 and not with the stretch 32. The constriction is applied through stretch 31 to press against the tube wall 32 which is to be torn at 28'. As a result both tube wall stretches will be cut.

Another difference between the forms constricting two stretches under the same staple bar lies in the fact that in Figures 1 to 3 and 17 to 19 the tube end comes down within the staple from above and the tube extends directly upwardly from the staple fastening whereas in Figures 4 to 6 the tube end enters beneath the staple from below and the tube is bent and passes outwardly and then upwardly from below the staple bar.

The form of Figures 4-6 would therefore require the flattening of a longer section of tube length than would be required in the forms of Figures 1-3 and 17-19.

In the forms of Figures 7-10, 11-13, 14-16 and 19-22 each staple bar engages with one stretch only of the flattened end of the tube. This is stretch 31 in the case of the lower staple in Figures 7-10 and 11-13. For the upper staple in Figures 7-10 a stretch 39 is engaged by the staple bar, here again requiring a longer flattened section of the tube because of the stretch 38 between the two staples. In the form of Figures 14-16 and 20-22 an intermediate stretch 38 is engaged by the staple bar, the stretches 31 and 32 lying outside of the staple but assisting in sealing by reason of the lengths of the stretches and the permissible sharp bends at 30. In Figs. 20, 21 and 21a the lower bend has been indicated by the reference numeral 37.

It will be obvious that the flattening and bending of the lower parts of the tube ends as well as the placing of the staples and clinching of their prongs 34 and 35 may be performed by hand or by machine after the tubes shall have been filled.

There is a very real advantage in having the staple bar come directly against the outer wall of the tube along the line of cut or tear so that in cutting or tearing the outer wall first (i. e., the wall farther from the mount) and the inner wall immediately thereafter may be cut or torn against the edge of the staple bar. To remove the tube it is bent toward the observer in Figure 1 and then is drawn off to either side to bring special pressure of the edge of the flattened part of the tube against the staple bar and progressively to cut or tear the tube against the staple bar.

As will be seen the number of sharp turns made in the flattened filling end of the tube and whether or not these reversely turned portions lie within the constriction by the staple bar will affect the capabilities of the seal produced, making some of these forms much more satisfactory for viscous and other semi-fluid contents and others not so satisfactory for such use, being better suited for tubes holding solid contents. The extent to which reliance is had for sealing upon the constriction of a flattened double tube wall by a bar will determine whether the closure formed in that particular case should be reinforced by another staple or by opposite short bends of the flattened filling end of the tube.

In all of the forms not only does the staple hold the flattened filling opening of the tube tight against the support so as to seal the tube and to hold the tube in upright position or sustain it in downwardly extending position, if that be desired, but the staple bar also preferably presses and ultimately cuts or tears directly against the tube wall.

This is true even when other walls of the tube are immediately in contact with the bar and must first be cut or torn against the bar. These cut or tear easily because of the character of the metal—and also desirably because of the thinning—and the tube walls which lie back and do not immediately engage the bar are cut or torn either concurrently or subsequently.

It will be evident that the tube can be torn against the staple to release the contents in all these forms, but that the operation will be most easily performed and most satisfactory where all of the special features of my invention are present, namely, the thin wall tube, the abrupt edge staple bar—square in section at the cutting edge, or, better, acute angled and the engagement of the staple with the adjacent wall of the tube which is directly to be severed.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. The method of mounting an open ended collapsible metallic tube on backing, while sealing it by means of the mounting, and subsequently opening it, which consists in collapsing opposite walls of the tube into contact the full width of the tube, bringing the tube into a collapsed straight position, in constricting the walls so flattened along a sharp line transverse to the tube length extending completely across the tube along the tube surface while at the same time attaching the tube to the mounting and sealing the open end by the attaching means, and in cutting or tearing the body of the tube free from the mount and constricted closed end by pulling it transversely with respect to the constriction and to the tube surface.

2. A mount, a collapsible metallic tube flattened to its full width, the inside of one wall against the inside of the opposite wall, forming a double wall support at its filling end, located upon the mount and a staple transversely spanning the full width of the tube and having its bar directly engaging the tube at a flattened part of the tube to hold the opposite flattened walls of the tube together to seal them and to hold the tube upon the backing, said bar in cross section having an abrupt edge facing in such direction that it is engaged by said flattened part to tear the latter.

3. A single use collapsible metallic tube having its walls collapsed, one wall against the opposite wall for the full collapsed tube width at the filling end of the tube, a card and a staple transversely spanning the tube, engaging the collapsed and flattened part of the tube adjacent the end to hold the tube against the card and having a cutting edge of the staple engaging the adjacent tube wall, facing the body of the tube and formed by faces intersecting at an acute angle in the edge which is in engagement with the tube and against which the tube can be cut.

4. A single use collapsible metallic tube having one end closed and its wall at the filling end collapsed so that opposite sides are brought into contact, and the outer collapsed end portion turned back upon the adjacent collapsed tube having at this point the full width of the collapsed side walls, a card and a staple transversely spanning the entire width of the adjacent collapsed tube, the bar of the staple engaging the collapsed adjacent tube as distinguished from engaging the end which has been turned back, holding the tube to the card with the turned back portion toward the card, said staple bar having a face engaging the collapsed tube surface and a second face at an acute angle to the first face and forming with it a cutting edge, against which the tube can be cut or torn.

5. A single use, collapsible metallic tube having its opposite walls near its open end collapsed against each other to full collapsed tube width and the collapsed end folded back along the adjacent collapsed tube, a mount and a staple spanning the entire collapsed width of the tube engaging that surface of said adjacent tube lying farther from the mount and having the bar of the staple constricting the tube and affording an abrupt cutting edge against which the tube can be cut or torn.

MARK KENYON DRESDEN.